(12) United States Patent
Klewer

(10) Patent No.: US 8,468,847 B2
(45) Date of Patent: Jun. 25, 2013

(54) AIRCRAFT AIR-CONDITIONING UNIT AND METHOD FOR OPERATING AN AIRCRAFT AIR-CONDITIONING UNIT

(75) Inventor: Guido Klewer, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 957 days.

(21) Appl. No.: 12/322,281

(22) Filed: Jan. 30, 2009

(65) Prior Publication Data

US 2009/0211273 A1   Aug. 27, 2009

Related U.S. Application Data

(63) Continuation of application No. PCT/EP2007/006610, filed on Jul. 25, 2007.

(30) Foreign Application Priority Data

Jul. 31, 2006   (DE) .......................... 10 2006 035 621

(51) Int. Cl.
*F25D 9/00* (2006.01)
(52) U.S. Cl.
USPC ........................................................... 62/401
(58) Field of Classification Search
USPC ..................................... 62/89, 244, 401, 498
See application file for complete search history.

(56) References Cited

U.S. PATENT DOCUMENTS

| | | | |
|---|---|---|---|
| 2,970,437 A * | 2/1961 | Anderson | 60/785 |
| 6,296,957 B1 | 10/2001 | Graage | |
| 6,429,019 B1 * | 8/2002 | Goldstein et al. | 436/134 |
| 7,273,120 B2 * | 9/2007 | Tabata | 180/65.265 |
| 7,560,179 B2 * | 7/2009 | Tahara | 429/431 |

FOREIGN PATENT DOCUMENTS

| | | |
|---|---|---|
| DE | 199 27 518 A | 6/1999 |
| DE | 198 21 952 A1 | 11/1999 |
| DE | 199 27 518 A1 | 1/2001 |
| DE | 10 2004 058 430 A1 | 6/2006 |
| EP | 0 957 026 A2 | 4/1999 |
| JP | 200025696 A | 1/2000 |
| RU | 2 220 884 C2 | 1/2004 |
| WO | WO 2005/110844 | 11/2005 |
| WO | WO 2005/110844 A1 | 11/2005 |
| WO | WO2006/115657 A2 | 11/2006 |

OTHER PUBLICATIONS

ISR from PCT/EP07/006610, Jul. 25, 2007, Airbus Deutschland GmbH.

(Continued)

*Primary Examiner* — Melvin Jones
(74) *Attorney, Agent, or Firm* — Krieg DeVault LLP

(57) ABSTRACT

An aircraft air-conditioning unit (10) includes a compressor (18) and a motor (20) driving the compressor (18). A fuel cell system (24) is connected directly to a control unit (22) for controlling the motor (20) driving the compressor (18), wherein the control unit (22) is adapted to convert electrical energy directly generated by the fuel cell system (24) into corresponding electrical control signals for controlling the motor (20) driving the compressor (18). In a method for operating an aircraft air-conditioning unit (10), which includes a compressor (18) and a motor (20) driving the compressor (18), a control unit (22) for controlling the motor (20) driving the compressor (18), which is directly connected to a fuel cell system (24), converts electrical energy directly generated by the fuel cell system (24) into corresponding electrical control signals for controlling the motor (20) driving the compressor (18).

20 Claims, 1 Drawing Sheet

OTHER PUBLICATIONS

International Search Report, PCT/EP2007/006610, Airbus Deutschland Gmbh, The International Searching Authority/European Patent Office, Jul. 25, 2007.

International Preliminary Report on Patentability, PCT/EP2007/006610, Airbus Deutschland Gmbh, The International Bureau of WIPO, Feb. 3, 2009.

Cover sheet and corresponding English abstract for DE 19821952, Nov. 18, 1999, DBB Fuel Cell Engines GmbH.

Cover sheet and corresponding English abstract for DE 102004058430, Jun. 8, 2006, Airbus GmbH.

English language translation of Decision on Granting from the Russian Federal Service for Intellectual Property Patents and Trademarks, Application No. 2009101941/11(002415), dated Aug. 19, 2011.

English translation of Japanese patent application 2009-522145 Office Action from Sugimura International Patent and Trademark Attorneys, Apr. 10, 2012.

Machine translation of DE 199 27 518.

* cited by examiner

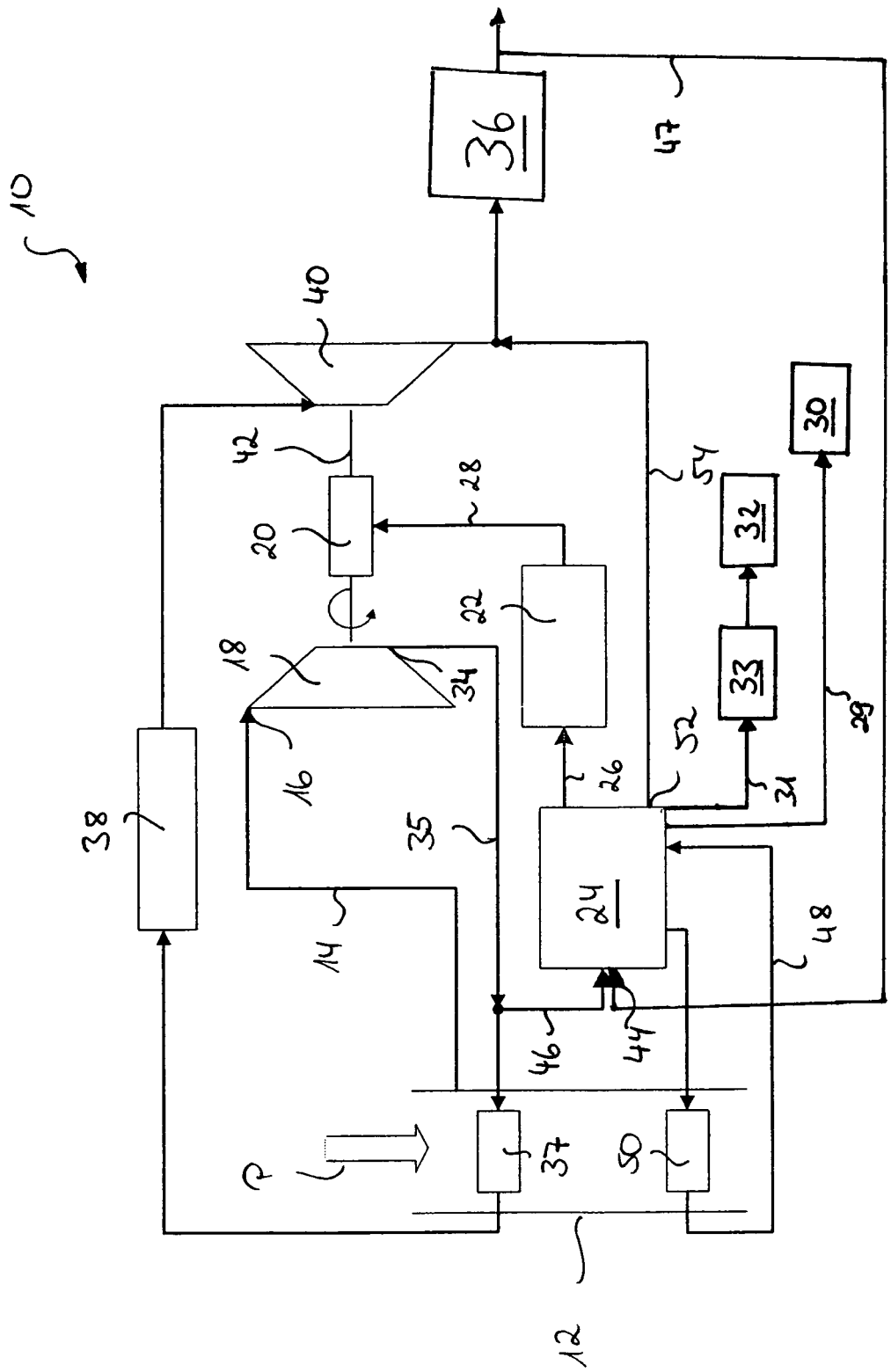

AIRCRAFT AIR-CONDITIONING UNIT AND METHOD FOR OPERATING AN AIRCRAFT AIR-CONDITIONING UNIT

CROSS REFERENCE TO RELATED APPLICATIONS

The present application is a continuation application of PCT/EP2007/006610 filed Jul. 25, 2007 which claims priority to German Patent Application No. 10 2006 035 621.7, filed Jul. 31, 2006, each of which is incorporated herein by reference.

The present invention relates to an aircraft air-conditioning unit that includes a compressor as well as a motor driving the compressor. In addition the invention relates to a method for operating such an aircraft air-conditioning unit.

Air-conditioning units provided on board an aircraft are currently normally operated with compressed air, wherein the compressed air is either drawn as tapped air from a compressor associated with a main drive unit, or is generated by a compressor. If an electrically operated compressor is used to generate the compressed air for the aircraft air-conditioning unit, the electrical energy required to supply the compressor is provided by generators that are driven by the main drive units or by an auxiliary gas turbine (auxiliary power unit, APU).

At the present time attempts are being made to use a fuel cell system, instead of the generators driven by the main drive units or by the auxiliary turbine, to generate the electrical energy required on board an aircraft. In order that a load-dependent direct voltage generated by the fuel cell system can be used by the large number of different electrical consumers to be supplied with electrical energy via an on-board network, it is however necessary to transform the electrical energy generated by the fuel cell system with the aid of electrical transformers (e.g. DC/AC transformers or DC/DC transformers) and to feed the electrical energy via a corresponding bus system (AC bus system or DC bus system) to the individual electrical consumers. Furthermore the necessary electrical transformers cause irregularities and interferences in the electrical energy supplied by the fuel cell system, which require the use of network filters in order to ensure also an orderly functioning of components that are sensitive to such irregularities and interferences. Each transformation of the electrical energy generated by the fuel cell system causes losses however, which adversely affect the efficiency of the overall system. Moreover, the use of transformers and network filters requires extra installation space and results in an increased weight of the overall systems.

The object of the invention is to provide an aircraft air-conditioning unit that is supplied with electrical energy in a reliable manner and with a high efficiency.

In order to achieve this object an air-conditioning unit according to the invention includes a compressor and a motor driving said compressor. In addition the aircraft air-conditioning unit according to the invention includes a fuel cell system that is connected directly to a control unit for controlling the motor driving the compressor, wherein the control unit is designed to convert electrical energy generated directly by the fuel cell system into corresponding electrical control signals for controlling the motor driving the compressor. A "direct" connection between the fuel cell system and the control unit for controlling the motor driving the compressor is understood in this connection to mean an electrical connection without the interconnection of separate electrical transformers and network filters. In a similar way electrical energy generated "directly" by the fuel cell system is understood to mean electrical energy that has neither been transformed by using a separate electrical transformer, nor has been filtered through a network filter.

In other words, the control unit of the aircraft air-conditioning unit according to the invention is designed so that it can directly utilise the load-dependent direct voltage generated by the fuel cell system and can convert it into corresponding control signals for controlling the motor driving the compressor. The electrical control signals emitted by the control unit are preferably adapted to the configuration of the motor driving the compressor (A.C. motor or D.C. motor). The control unit thus performs a double function, namely on the one hand to control as desired the motor driving the compressor, and at the same time to ensure that the motor driving the compressor is supplied with electrical energy.

The aircraft air-conditioning unit according to the invention can dispense with the use of separate electrical transformers for the transformation of the load-dependent direct voltage generated by the fuel cell system as well as the use of network filters for filtering irregularities and interferences in the electrical energy provided by the fuel cell system. The electrical consumers of the aircraft air-conditioning unit according to the invention can thus be supplied with electrical energy in an energy-efficient, environmentally friendly and reliable way and manner with the aid of the fuel cell system. At the same time the air-conditioning unit according to the invention is of relatively simple design and construction since it dispenses with separate electrical transformers and network filters, and also has a smaller installation space requirement and weighs less. A further advantage is the fact that the fuel cell system can be operated in a particularly energy-efficient manner.

Electrical consumers on board the aircraft not counted as part of the air-conditioning unit according to the invention can be supplied with electrical energy with the aid of a further fuel cell system but also with the fuel cell system supplying the electrical consumers of the aircraft air-conditioning unit with electrical energy. Structural parts that are sensitive to irregularities and interferences in the electrical energy supplied by the fuel cell system can be connected to the fuel cell system via the interconnection of a separate electrical transformer and a network filter or an electrical transformer with an integrated network filter. Non-sensitive consumers outside the air-conditioning unit according to the invention can however be supplied directly with electrical energy generated by the fuel cell system, i.e. without the interconnection of an electrical transform and a network filter. Alternatively, electrical consumers on board the aircraft that are not counted as part of the air-conditioning unit according to the invention can however also be supplied in a conventional way and manner with electrical energy generated by the generators driven by the main drive units or by the auxiliary gas turbine of the aircraft.

Preferably an inlet of the compressor is connected via a compressor inlet line to an air duct of the aircraft air-conditioning unit. Ambient air for example flows through the air duct of the aircraft air-conditioning unit, so that ambient air can be fed from the air duct of the aircraft air-conditioning unit via the compressor inlet line to the compressor inlet. It is however also possible to feed a mixture of ambient air and cabin waste air to the compressor inlet, in which case the cabin waste air can be introduced for example via a cabin waste air line into the air duct of the aircraft air-conditioning unit or into the compressor inlet line.

An outlet of the compressor is on the other hand preferably connected to an air feed line for feeding air to an aircraft cabin. Air compressed and thereby heated in the compressor can thus be fed through the air feed line into the aircraft cabin.

A heat exchanger can be arranged in the air feed line, which serves to cool the air compressed by the compressor and flowing through the air feed line. Preferably the heat exchanger is arranged in the air duct of the aircraft air-conditioning unit through which ambient air flows, so that the air flowing through the air feed line can be cooled in an energy-efficient way and manner. Furthermore, a condenser for removing moisture from the air flowing through the air feed line can be provided in the air feed line. Finally, it is possible to arrange a turbine in the air feed line, in which the air compressed by the compressor and flowing through the air feed line is expanded and thereby cooled to the desired low temperature. The turbine is preferably arranged together with the compressor on a common shaft, so that the energy recovered in the operation of the turbine can be used, apart from driving the motor, also to drive the compressor.

A fuel cell employed in the fuel cell system of the air-conditioning unit according to the invention includes a cathode region as well as an anode region separated from the cathode region by an electrolyte. In the operation of the fuel cell a hydrogen-containing fuel gas is fed to the anode side of the fuel cell, and an oxygen-containing oxidizing agent, for example air, is fed to the cathode side of the fuel cell. In a polymer electrolyte membrane (PEM) fuel cell the hydrogen molecules react at an anode catalyst present in the anode region, for example according to the equation $$H_2 \rightarrow 2.H^+ + 2.e^-$$

and thereby release electrons at the electrode with the formation of positively charged hydrogen ions.

In other types of fuel cells, such as for example an oxide ceramic fuel cell (SOFC, solid oxide fuel cell) the anode reaction is on the other hand for example $$O^{2-} + H_2 \rightarrow H_2O + 2.e^-.$$

In a PEM fuel cell the $H^+$ ions formed in the anode region then diffuse through the electrolyte to the cathode, where they react at a cathode catalyst present in the cathode region and typically applied to a carbon carrier, with the oxygen fed to the cathode as well as with the electrons fed to the cathode via an external circuit, according to the equation $$0.5.O_2 + 2.H^+ + 2.e^- \rightarrow H_2O$$

to form water.

In a SOFC the cathode reaction is on the other hand for example $$0.5.O_2 + 2.e_- \rightarrow O^{2-},$$

wherein the $O^{2-}$-ions diffuse from the cathode to the anode. The waste gas from a fuel cell of the fuel cell system thus contains water.

A waste gas outlet of the fuel cell system is therefore preferably connected to the air feed line of the air-conditioning unit according to the invention, in order to utilise the water contained in the fuel cell waste gas so as to moisturise the air to be fed to the aircraft cabin. Accordingly, apart from the electrical energy generated by the fuel cell system the water generated in the operation of the fuel cell system can also be utilised for the operation of the aircraft air-conditioning unit according to the invention.

In a preferred embodiment of the aircraft air-conditioning unit according to the invention an outlet of the compressor is for example connected via an air inlet line to an air inlet of the fuel cell system, in order to feed air compressed by the compressor to the fuel cell system, i.e. to the cathode side of the fuel cell provided in the fuel cell system. The air inlet line of the fuel cell system may for example branch from the air feed line connected to the outlet of the compressor. The compressor of the aircraft air-conditioning unit according to the invention is thus utilised not only to generate compressed air for the aircraft air-conditioning unit, but also to supply the fuel cell system with compressed air. Just as in the moisturisation of the air to be fed to the aircraft cabin with the aid of the water-containing waste gas from the fuel cell system, a synergistic effect is achieved by the use of the compressor to generate compressed air for the aircraft air-conditioning unit and for the fuel cell system.

The fuel cell system can with the aid of the compressor of the aircraft air-conditioning unit be supplied with compressed ambient air. In addition or alternatively, it is however also possible to feed cabin waste air to the fuel cell system. For this purpose a waste air line of an aircraft cabin can be connected to an air inlet of the fuel cell system. The cabin waste air can be fed directly to the fuel cell system. The waste air line of the aircraft cabin is then for example connected directly to the air inlet or to the air inlet line of the fuel cell system. It is however also possible to introduce cabin waste air into the air duct of the aircraft air-conditioning unit or into the compressor inlet line, so that a mixture of ambient air and cabin waste air compressed by the compressor is fed to the fuel cell system.

Preferably a cooling system of the fuel cell system integrated into the aircraft air-conditioning unit according to the invention includes a heat exchanger arranged in the air duct of the aircraft air-conditioning unit. For example the heat exchanger can be integrated in a cooling circuit of the fuel cell system, so that cooling fluid flowing through is the cooling circuit can be cooled to a desired low temperature in the heat exchanger arranged in the air duct of the aircraft air-conditioning unit. In addition or alternatively, it is however also possible to feed in a different way and manner waste heat generated by the fuel cell system into the aircraft air-conditioning unit according to the invention and to utilise the waste heat for example to heat air to be fed to the aircraft cabin.

In a method according to the invention for operating an aircraft air-conditioning unit that includes a compressor and a motor driving the compressor, a control unit for controlling the motor driving the compressor, which is connected directly to a fuel cell system, converts electrical energy directly generated by the fuel cell system into corresponding control signals for controlling the motor driving the compressor.

A "direct" connection between the fuel cell system and the control unit for controlling the motor driving the compressor is understood again in this connection to mean an electrical connection without the interconnection of separate electrical transformers and network filters. Similarly, electrical energy generated "directly" by the fuel cell system is understood again to denote electrical energy that has neither been transformed by using a separate electrical transformer, nor has been filtered through a network filter.

In a preferred embodiment of the method according to the invention for operating an aircraft air-conditioning unit, ambient air flowing through an air duct of the aircraft air-conditioning unit is fed via a compressor inlet line to an inlet of the compressor.

Preferably air from an outlet of the compressor is fed via an air feed line to the aircraft cabin, wherein the air flowing through the air feed line can be cooled before entering the aircraft cabin by means of a heat exchanger arranged in the air feed line. The heat exchanger is for example arranged in the air duct of the aircraft air-conditioning unit. Furthermore, by means of a condenser arranged in the air feed line moisture can be removed from the air flowing through the air feed line and compressed by the compressor. Finally, it is also possible to lead the air flowing through the air feed line and compressed by the compressor through a turbine, so that the air expands and is thereby cooled. The energy recovered in the operation of the turbine is preferably utilised, in addition to the drive energy provided by the motor, to drive the compressor.

In order to moisturise the air to be fed to the aircraft cabin, water-containing waste gas from the fuel cell system is fed preferably from a waste gas outlet of the fuel cell system to the air feed line.

In a preferred embodiment of the method according to the invention for operating an aircraft air-conditioning unit, air compressed by the compressor is fed to an air inlet of the fuel cell system connected to the compressor outlet for example via an air inlet line branching from the air feed line.

Alternatively or in addition, cabin waste air drawn off from an aircraft cabin can also be used to supply the fuel cell system with air. Cabin waste air is then fed to the fuel cell system via an air inlet connected to a waste air line of the aircraft cabin.

A cooling fluid of the fuel cell system is preferably led through a heat exchanger arranged in the air duct of the aircraft air-conditioning unit, in order to cool the cooling fluid there in an energy-efficient way and manner to the desired low temperature. Alternatively or in addition, the waste heat generated by the fuel cell system can also be fed into the aircraft air-conditioning unit and used for example to heat the air to be fed to the aircraft cabin.

The FIGURE illustrates diagrammatically one form of an aircraft air-conditioning unit according to the invention. A preferred embodiment of the invention is described in more detail hereinafter with the aid of the accompanying drawing, which illustrates diagrammatically an aircraft air-conditioning unit according to the invention.

The aircraft air-conditioning unit 10 illustrated in the FIGURE includes an air duct 12 through which flows ambient air in the direction of the arrow P. The air duct 12 is connected via a compressor inlet line 14 to an inlet 16 of a compressor 18. Ambient air flowing through the air duct 12 can thus be fed via the compressor inlet line 14 to the compressor 18 and compressed by the compressor 18.

The compressor 18 of the aircraft air-conditioning unit 10 is driven by an A.C. motor 20, which is controlled with the aid of an electronic control unit 22. A fuel cell system 24 serves to generate electrical energy. The electronic control unit 22 is connected via an electrical line 26 directly, i.e. without the interconnection of a separate electrical transformer, to the fuel cell system 24 and is configured so that it can be supplied with electrical energy by the load-dependent direct voltage generated directly by the fuel cell system 24. By eliminating a transformer causing interferences, the use of a network filter between the fuel cell system 24 and the electronic control unit 22 can also be dispensed with. The electronic control unit 22 converts the electrical energy supplied to it by the fuel cell system 24 into corresponding electrical control signals, which are passed to the compressor drive motor 20 via an electrical line 28.

Furthermore the fuel cell system 24 is connected via an electrical line 29 directly, i.e. without the interconnection of electrical transformers and network filters, to further electrical consumers 30 not counted as part of the air-conditioning unit 10. Just like the electronic control unit 22 of the aircraft air-conditioning unit 10, the electrical consumers 30 can be supplied directly with the load-dependent direct voltage generated by the fuel cell system 24.

Finally, the fuel cell system 24 feeds electrical energy via an electrical line 31 into an electrical network 32 of the aircraft. In order that the load-dependent direct voltage generated by the fuel cell system 24 can be utilised by various electrical consumers outside the air-conditioning unit 10 which are not shown in the FIGURE and which are supplied with electrical energy via the network 32, the electrical energy generated by the fuel cell system 24 is transformed and filtered with the aid of an integrated electrical transformer/network filter 33.

An outlet 34 of the compressor 18 driven by the motor 20 is connected to an air feed line 35, which serves to feed air to an aircraft cabin 36. A first heat exchanger 37 positioned in the air duct 12 is arranged in the air feed line 35, which heat exchanger serves to cool the air compressed and thereby heated by the compressor 18 and flowing through the air feed line 35, by heat transfer to the ambient air flowing through the air duct 12. A condenser 38 for removing moisture from the air flowing through the air feed line 35 is provided downstream of the first heat exchanger 37 in the air feed line 35.

A turbine 40 is arranged downstream of the condenser 38 in the air feed line 35. When the air compressed by the compressor 18 and flowing through the air feed line 35 is led through the turbine 40, the air expands and thereby cools. The turbine 40 is arranged together with the compressor 18 on a common shaft 42, so that the energy recovered in the operation of the turbine 40 can be used, in addition to the drive energy of the compressor drive motor 20, to drive the compressor 18.

An air inlet line 46 connecting the air feed line 35 to an air inlet 44 of the fuel cell system 24 branches from the air feed line 35 upstream of the first heat exchanger 37. The air compressed by the compressor 18 is thus fed not only to the aircraft cabin 36, but is also used to supply the fuel cell system 24 with air. Furthermore, cabin waste air is fed to the air inlet 44 of the fuel cell system 24 via a waste air line 47 of the aircraft cabin 36.

A cooling system 48 of the fuel cell system 24, through which cooling fluid flows, includes a second heat exchanger 50 which, just like the first heat exchanger 37, is arranged in the air duct 12 of the aircraft air-conditioning unit 10. The ambient air flowing through the air duct 12 can thus be utilised to cool the cooling fluid flowing through the cooling system 48 of the fuel cell system 24.

A waste gas outlet 52 of the fuel cell system 24 is connected via a waste gas line 54 downstream of the turbine 40 to the air feed line 35. Since water is generated in the operation of the fuel cell system 24, the water-containing waste air from the fuel cell system can be utilised to moisturise the air to be fed to the aircraft cabin 36.

In the aircraft air-conditioning unit 10 illustrated in the FIGURE, exclusively ambient air flowing through the air duct 12 is fed to the compressor inlet 16. It is however also possible to feed cabin waste air extracted from the aircraft cabin 36, possibly mixed with ambient air, to the compressor inlet 16. For example, the cabin waste air can be introduced into the air duct 12 or into the compressor inlet line 14.

The invention claimed is:
1. Aircraft air-conditioning unit with:
a compressor and
a motor driving the compressor, and
a fuel cell system,
wherein the fuel cell system is connected directly to a control unit via a first electrical line, the control unit being connected to the motor driving the compressor via a second electrical line and being adapted to directly control the motor driving the compressor by converting load-dependent direct voltage generated directly by the fuel cell system into corresponding electrical control signals and by supplying the electrical control signals to the motor driving the compressor vial the second electrical line.

2. Aircraft air-conditioning unit according to claim 1, wherein an inlet of the compressor is connected via a compressor inlet line to an air duct of the aircraft air-conditioning unit, in order to feed ambient air flowing through the air duct of the air-conditioning unit, to the inlet of the compressor.

3. Aircraft air-conditioning unit according to claim 1, wherein an outlet of the compressor is connected to an air feed line for feeding air into an aircraft cabin.

4. Aircraft air-conditioning unit according to claim 3, wherein a first heat exchanger and/or a condenser and/or a turbine is/are arranged in the air feed line.

5. Aircraft air-conditioning unit according to claim 3, wherein a waste gas outlet of the fuel cell system is connected to the air feed line.

6. Aircraft air-conditioning unit according to claim 1, wherein an outlet of the compressor is connected to an air inlet of the fuel cell system, in order to feed air compressed by the compressor to the fuel cell system.

7. Aircraft air-conditioning unit according to claim 1, wherein an air inlet of the fuel cell system is connected to a waste air line of an aircraft cabin.

8. Aircraft air-conditioning unit according to claim 1, wherein a cooling system of the fuel cell system includes a second heat exchanger arranged in an air duct of the aircraft air-conditioning unit.

9. Method for operating an aircraft air-conditioning unit, which includes a compressor, a motor driving the compressor and a fuel cell system, wherein a control unit, which is connected directly to the fuel cell system via a first electrical line and which further is connected to the motor driving the compressor via a second electrical line, directly controls the motor driving the compressor by converting load-dependent direct voltage directly generated by the fuel cell system into corresponding electrical control signals for controlling the motor driving the compressor and by supplying to cooresponding electrical control signals to the motor driving the compressor vial the second electrical line.

10. Method for operating an aircraft air-conditioning unit according to claim 9, wherein ambient air flowing through an air duct of the aircraft air-conditioning unit is fed via a compressor inlet line to an inlet of the compressor.

11. Method for operating an aircraft air-conditioning unit according to claim 9, wherein air from an outlet of the compressor is fed via an air feed line to an aircraft cabin.

12. Method for operating an aircraft air-conditioning unit according to claim 11, wherein the air flowing through the air feed line is cooled by means of a first heat exchanger arranged in the air feed line and/or moisture is removed from the air flowing through the air feed line by means of a condenser arranged in the air feed line, and/or the air flowing through the feed line air is expanded and thereby cooled by means of a turbine arranged in the air feed line.

13. Method for operating an aircraft air-conditioning unit according to claim 11, wherein waste gas from the fuel cell system is fed from a waste gas outlet of the fuel cell system to the air feed line.

14. Method for operating an aircraft air-conditioning unit according to claim 9, wherein air compressed by the compressor is fed to the fuel cell system via an air inlet connected to an outlet of the compressor.

15. Method for operating an aircraft air-conditioning unit according to claim 9, wherein cabin waste air is fed to the fuel cell system via an air inlet connected to a waste air line of an aircraft cabin.

16. Method for operating an aircraft air-conditioning unit according to claim 9, wherein a cooling fluid of the fuel cell system is led through a second heat exchanger arranged in an air duct of the aircraft air-conditioning unit.

17. Aircraft air-conditioning unit according to claim 2, wherein an outlet of the compressor is connected to an air feed line for feeding air into an aircraft cabin.

18. Aircraft air-conditioning unit according to claim 4, wherein a waste gas outlet of the fuel cell system is connected to the air feed line.

19. Method for operating an aircraft air-conditioning unit according to claim 10, wherein air from an outlet of the compressor is fed via an air feed line to an aircraft cabin.

20. Method for operating an aircraft air-conditioning unit according to claim 12, wherein waste gas from the fuel cell system is fed from a waste gas outlet of the fuel cell system to the air feed line.

* * * * *